April 20, 1937. W. C. WALKER 2,077,444
FLOW METER
Filed Aug. 15, 1934 4 Sheets-Sheet 1

Inventor
William C. Walker.
By Stone, Boyden & Mack
Attorneys.

April 20, 1937. W. C. WALKER 2,077,444
FLOW METER
Filed Aug. 15, 1934 4 Sheets-Sheet 2

Inventor
William C. Walker.
By Stone, Boyden & Mack.
Attorneys.

April 20, 1937.  W. C. WALKER  2,077,444
FLOW METER
Filed Aug. 15, 1934   4 Sheets-Sheet 3

Inventor
William C. Walker
By Stone, Boyden + Mack
Attorneys.

April 20, 1937. W. C. WALKER 2,077,444
FLOW METER
Filed Aug. 15, 1934 4 Sheets-Sheet 4
FIG. 9.
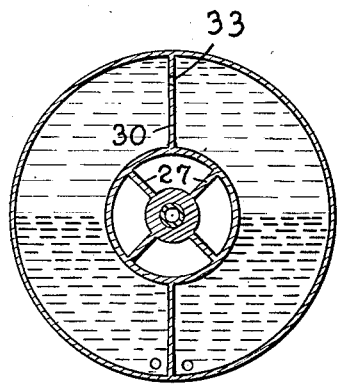
FIG. 10. FIG. 11. FIG. 12.
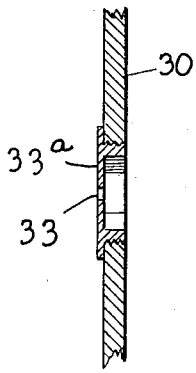 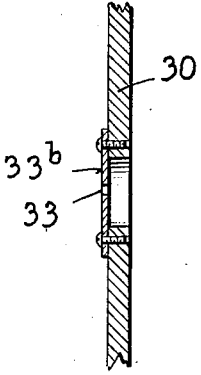 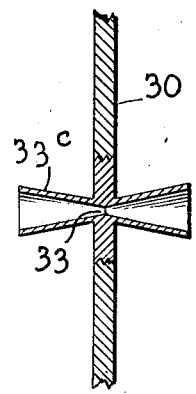
Inventor
William C. Walker
By Stone, Boyden & Mack
Attorneys Patented Apr. 20, 1937

2,077,444

REISSUED

UNITED STATES PATENT OFFICE 2,077,444

FLOW METER

William C. Walker, York, Pa.

Application August 15, 1934, Serial No. 739,985

6 Claims. (Cl. 73—206)

This application relates to flow meters. More particularly, it relates to that general type of flow meter which utilizes the pressure differential occurring adjacent a restricted aperture in a conduit for the purpose of actuating mechanism by which the volume of fluid passing through the conduit may be registered.

It is a general object of this invention to provide a flow meter of this general type which may be simply and cheaply constructed, and yet register exceptionally accurately the volume of fluid passing through the principal conduit.

Flow meters in general use at the present time in most instances employ a manometer which fluctuates responsive to the changes in head in the primary conduit. It is an object of this invention to produce a satisfactory meter which will eliminate the use of a manometer and which will therefore permit a much greater range and eliminate the use of the very heavy and often expensive manometric fluids required by the meters of the prior art.

In general, it is further the object of the invention to provide a flow meter in which the pressure differential developed adjacent the orifice in the conduit is used for passing a member having a secondary orifice through a relatively stationary body of liquid in order that by measuring the movement of the member with respect to the body of liquid through which it moves, the volume of flow through the primary conduit may be determined.

Although the invention herein illustrated is particularly adaptable for use with primary conduits having a restricted orifice or throat it is apparent that it may be used in connection with a Pitot tube or any other device where a pressure differential is set up by the flow of fluid through the primary conduit.

An object of the invention is to provide apparatus of this general type which will be extremely rugged and easily adjusted, in order that it may be used for relatively permanent installations and will require a minimum of care.

Still further, the invention contemplates provision of apparatus of this general type which will be sufficiently accurate for most practical installations and which will maintain high efficiency regardless of fluctuations in volume of flow through the primary conduit.

A consideration of the following specification in connection with the accompanying drawings will reveal many other and further objects and advantages.

In the accompanying drawings:

Fig. 9 illustrates a modified use of the drum for use in measuring the flow of liquids in which the drum is partially filled with a liquid lighter than the liquid being metered; and Figs. 10, 11, and 12 are enlarged views of various forms of orifices for controlling communication between the chambers of the drum.

Figure 1:
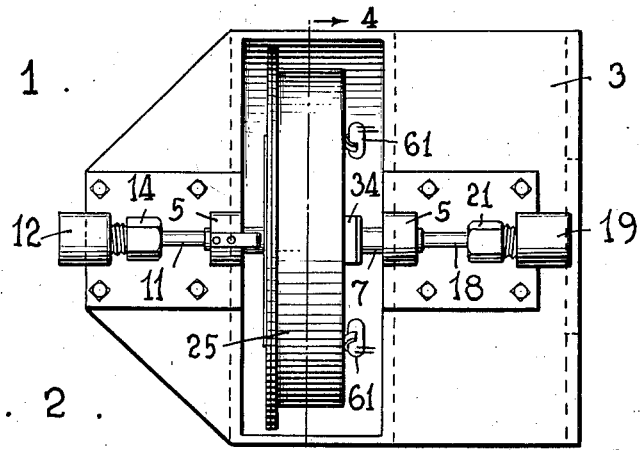
Fig. 1 is a plan view of the flow meter.
Figure 2:
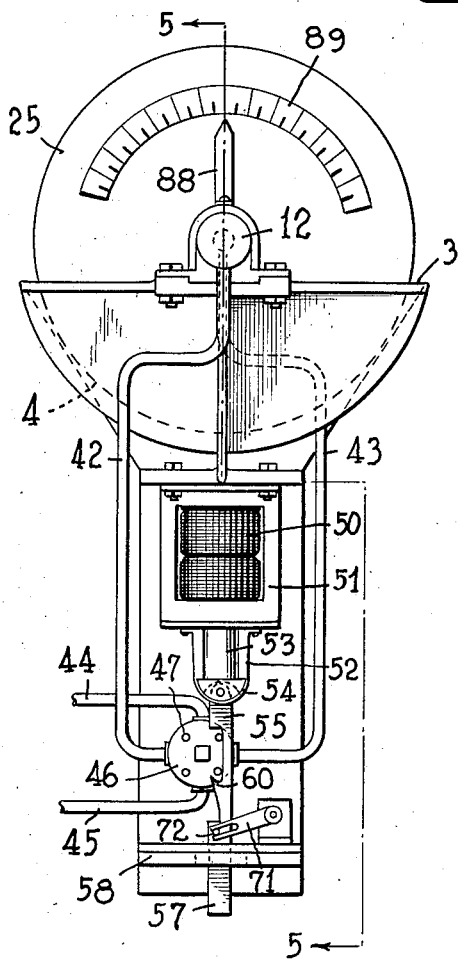
Fig. 2 is a front elevation of the meter shown in Fig. 1.
Figure 5:
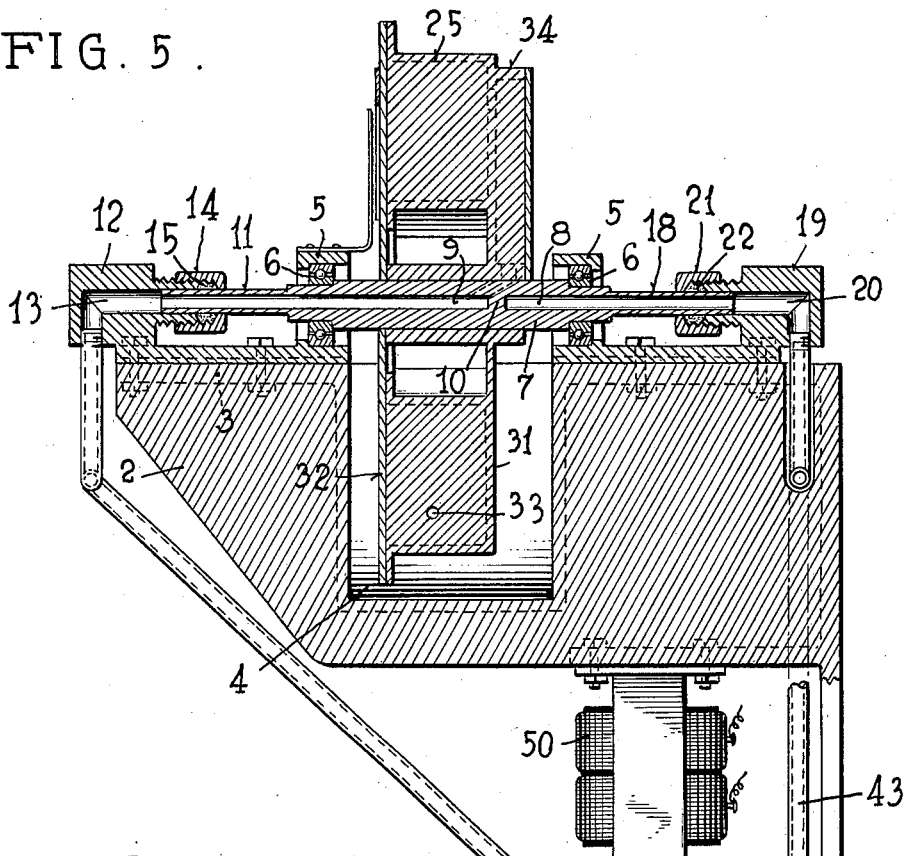
Fig. 5 is a vertical sectional view taken on the line 5—5 of Fig. 2 looking in the direction of the arrows.

With reference to the drawings, the apparatus includes a supporting bracket 1, (Figs. 1 and 5) adapted to be secured to a wall or other similar surface on which the meter may be mounted. The supporting bracket 1 has a forwardly extending web 2, which serves to rigidly support a shelf portion 3, extending outwardly from the upper end of the bracket 1.

The web and shelf portions 2 and 3 respectively are recessed to form a semi-cylindrical walled well 4 in the shelf for the reception of the movable portion of the apparatus which will now be described. Mounted upon the upper surface of the shelf 3 are a pair of bearing supports 5 adjacent the edge of the well 4. Each serves to house an annular series of ball bearing members 6. A shaft 7 is mounted for rotation in the bearing 6. This shaft 7 has an axial central portion of slightly increased diameter and contains a pair of axially disposed bores 8 and 9 extending inwardly from the ends of the shaft almost meeting each other. It is apparent from this construction that a wall 10 remains in the central portion of the shaft 7, preventing communication between the bores 8 and 9. One end of the shaft 7 is reduced in diameter to form a cylindrically axially extending portion 11 of substantially uniform diameter projecting some distance beyond the point where the shaft is mounted in the bearing 6.

A casting 12 is mounted adjacent the outer end of the shaft 7 and has a bore 13 therein adapted to receive the end portion 11 of the shaft 7. The portion of the casting 12 into which the shaft 7 extends is substantially cylindrical and threaded to receive a packing nut 14 serving to compress packing material 15 around the cylindrical portion 11 of the shaft 7. From the construction just described, it will be apparent that the axial bore 9 communicates with the bore 13 in the casting by means of a fluid tight joint, which will permit the transmission of fluid from the bore 13 into the bore 9 and which will also permit a relatively free rotation of the shaft 7 with respect to the casting 12.

The opposite end of the shaft 7 is likewise formed with a reduced cylindrical portion 18 extending into a casting 19 provided with an internal bore 20 substantially the same in function and construction as the casting 12 just described. Likewise, a fluid tight joint is maintained between the axial bore 8 and the passage 20 by means of a packing gland nut 21 and packing 22. Thus, it will be seen that the shaft 7 may rotate relatively freely within the bearing 6 while the internal bores 8 and 9 are maintained in constant communication with the bores 20 and 13 respectively in the castings 19 and 12.

Figure 4:
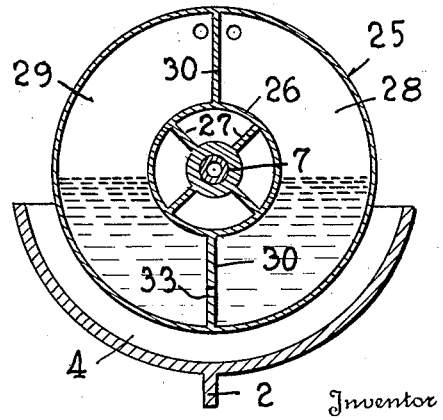
Fig. 4 is a sectional view taken on the line 4—4 of Fig. 1, looking in the direction of the arrows.

A cylindrical drum 25, mounted for partial rotation, is secured on the shaft 7 in any suitable manner which will prevent relative movement of the drum and shaft. The internal construction of this drum is clearly seen in Fig. 4. Concentrically mounted on said shaft inside said drum is a cylindrical partition wall 26, supported by a plurality of radially extending webs 27, the partition wall 26 forming with the drum 25 an annular chamber 28 surrounding the shaft and spaced a substantial radial distance therefrom.

The annular chamber is divided into two substantially semi-circular compartments 28 and 29, by means of a pair of radially disposed webs 30 extending from the wall 26 to the outer wall of the drum 25. The axial ends of this drum 25 are closed by means of suitable fluid tight walls 31 and 32. Thus it will be seen that the interior of the drum contains two fluid tight substantially semi-annularly extending chambers.

An orifice 33 is provided in the radially disposed web 30 to provide means of communication between the chambers.

On the end wall 31 of the drum is mounted a housing 34 which encloses a pair of conduits 35 and 36, each communicating with one of the chambers within the drum by means of suitable apertures in the wall 31. The opposite end of the conduit 35 communicates with the bore 8 in the shaft 7 and the conduit 36 communicates with the bore 9 in the shaft 7. The drum is partially filled with suitable liquid, such, for example, as water, which will flow through the orifice 33 until the liquid attains an equal level in both compartments of the drum.

The liquid used in the drum will necessarily depend upon the nature of the fluid being metered. It is obvious that the liquid used to be satisfactory in the apparatus shown in Figs. 1–5 must be heavier than, and insoluble in the fluid being metered.

It will now be seen that as long as the fluid pressure in the two compartments is equal, the drum will remain stationary, but in the event that the fluid pressure in either of the compartments becomes greater than in the other, liquid is forced through the orifice from one compartment into the other and a rotation of the drum will be caused by the greater weight of fluid on one side of the axis of the drum.

It will be further apparent that as such rotation takes place, due to the construction described above, the bores within the fittings 12 and 19 will remain in constant communication with the compartments within the drum, even though the drum may be rotated through a substantial number of degrees. Further, it will be clear that as rotation of the drum takes place, the liquid in the drum may flow from one compartment to the other through the orifice 33, thus maintaining the body of liquid within the drum in substantially the same position at all times.

It will be apparent that the liquid used in the drum will depend upon the fluid which is being metered. When a gas is being metered any liquid is satisfactory which will not dissolve an undue amount of the gas being metered. When a liquid is being metered a liquid must be used in the drum which is heavier than and will not mix with the liquid flowing through the main conduit.

In Fig. 9 is illustrated a modified arrangement in which a light oil or other liquid may be used when the apparatus is used for metering water. In this arrangement, it is seen that the connections to the drum are to the lower side thereof and that the lighter liquid will float on top of the water. It will be seen that this form of the apparatus is particularly adapted for metering relatively heavy liquids.

The orifice 33, affording communication between the two compartments is not limited as to size as the instrument may be calibrated for any particular orifice. In place of an orifice the opening between the two compartments may take the form of a nozzle or other type of opening through which the flow of the liquid takes place as a definite function of the difference of pressures existing in the two compartments. Figs. 10, 11, and 12 show three forms of opening suitable for providing communication between the two compartments. In Fig. 10 an aperture in the wall 30 is shown internally threaded to receive a casting 33$^a$ to provide a thin plate orifice. In Fig. 11 a plate 33$^b$ is shown secured to the partition 30 and in Fig. 12 a casting 33$^c$ is shown threaded into an internally threaded aperture in the partition to provide communication between the chambers of a nature of the throat of a venturi. It will be apparent that in each instance these orifices may be easily removed and changed at will.

A reversing valve 40 is mounted upon the bracket 1 beneath the shelf 2. This valve has a rotatable member mounted substantially centrally thereof which serves to control the flow through the valve. A pair of conduits 42 and 43 are connected to diametrically opposite sides of the valve, the conduit 42 communicating with the bore 13 in the fitting 12 and the conduit 43 connecting with the bore 20 in the fitting 19. Also connected to diametrically opposite sides of the valve are a pair of conduits 44 and 45, which connect with the principal differential head device in the conduit through which the flow is to be measured.

Figure 6:
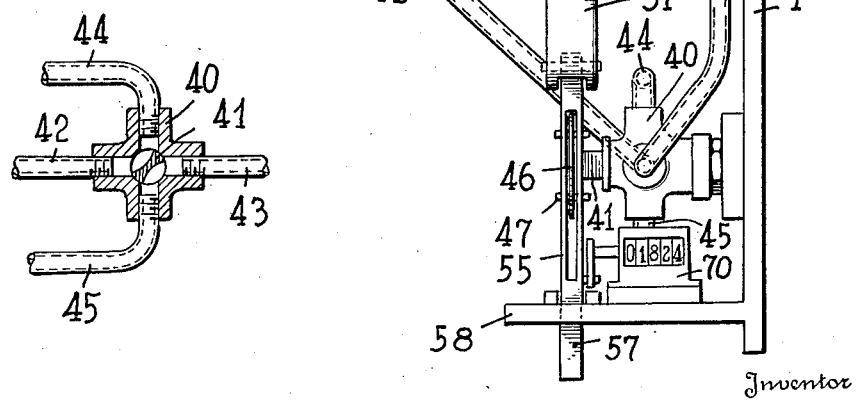
Fig. 6 is a sectional view showing the internal portions of the reversing valve.
Figure 7:
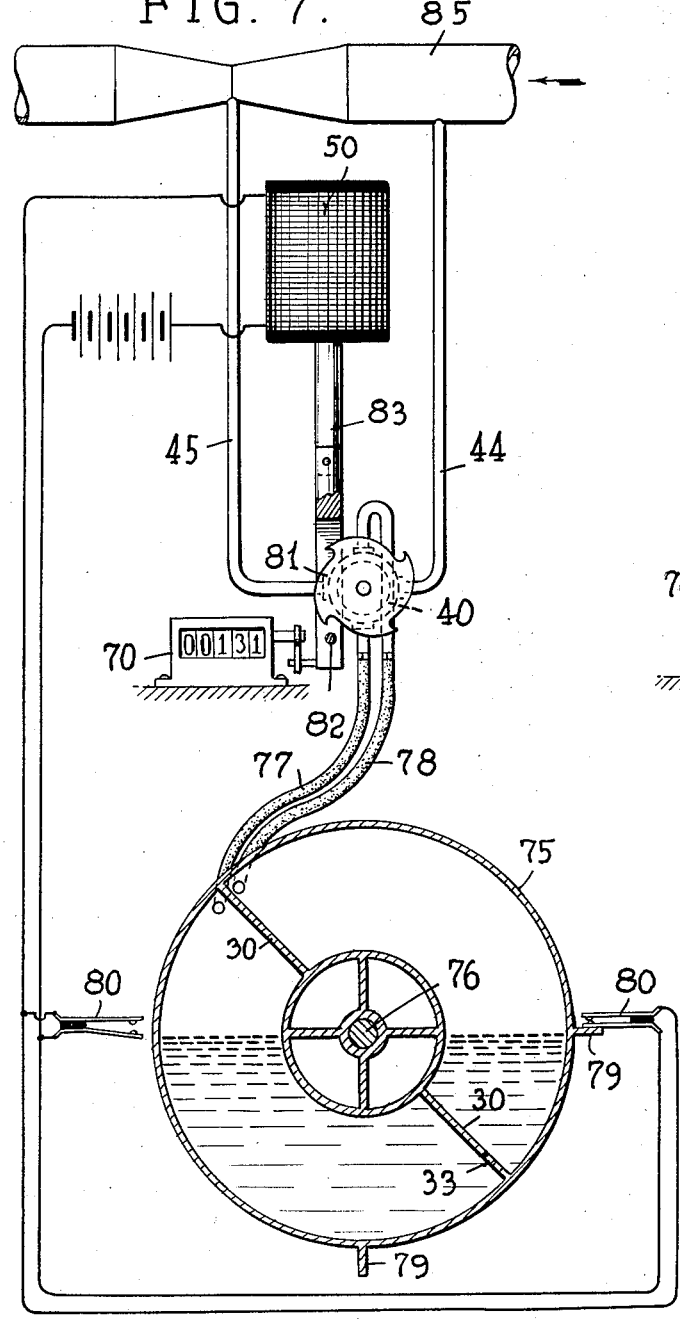
Fig. 7 is a diagrammatic view of a modified form of the apparatus illustrating the manner in which the meter may be connected to the conduit with which it is to be used.

The connections to the principal differential head device are not shown in Figs. 1 to 6, but are clearly seen in the diagrammatic view of the modified form of the apparatus in Fig. 7. From the construction of the valve 40 as seen in Fig. 6, it is apparent that when the rotatable central portion of the valve is in the position as shown in Fig. 6, the conduit 44 from the differential head device will be in communication with the conduit 42, communicating with the fitting 12, the bore 9 in the shaft 7, and hence in direct communication with the compartment 28 of the drum. Likewise, the conduit 45 from the differential head device will be in communication with the conduit 43 and due to the connections described above, will be in communication with the chamber 29 of the drum.

When the rotatable valve member 41 is moved through 90°, it is apparent that these connections will be reversed and the conduit 44 will then be in direct communication with chamber 29 of the drum and conduit 45 will then communicate with chamber 28 of the drum. Due to the symmetrical construction of the rotatable valve member 41, it will be seen that if it is moved through a second 90° of rotation, it will again assume substantially the position shown in Fig. 6 and function as described above.

Automatic means are provided for causing rotation of the reversing valve 40. The rotatable member 41 of this valve extends laterally a short distance from the body of the valve and has rigidly secured thereto a disc 46 having an annular series of pins 47 spaced around the axis of the disc at 90° intervals. These pins extend through the disc and protrude a short distance on either side thereof.

A solenoid 50 is secured to the under side of the web 2 which supports the shelf on which the drum is mounted. This solenoid is mounted in a suitable frame 51 and has depending therefrom a stirrup 52 which serves to limit downward movement of a reciprocable armature 53 slidably mounted within the solenoid.

The armature 53 has pivotally secured to its lower end 54 a slotted valve actuating bar 55. The valve actuating bar 55 is slotted and mounted in such a position that the disc 46 will extend into the slot thereof and has an extended lower end portion 57 extending a substantial distance below the valve 40.

A second shelf 58 extends from the bracket 1 and has a slot therein through which the lower end 57 of the bar 55 may pass. This slot, it will be seen, serves to limit lateral movement of the bar 55. Each of the members of the bar 55 which lie on either side of the disc 46 is provided with a tooth 60, adapted on its upper side to engage one of the pins 47 which pass through the disc 46. The lower side of the tooth 60 is tapered gradually in order that it will engage the pins.

From the foregoing, it will be clear that when the solenoid 50 is energized, the armature 53 will be drawn upwardly therein carrying with it the valve actuating bar 55 which is pivoted to the lower end thereof. As this valve actuating bar 55 is moved upwardly, the upper surface of the teeth 60 will each engage one of the pins 47 in the disc 46 and thus rotate the disc 46 through one-fourth of a revolution. When the solenoid is de-energized, the armature 53 will fall and the tapered lower surface of the tooth 60 will slide over the pin directly under the pin which it has engaged on its previous upward movement and drop to a position directly beneath this pin. Thus it is apparent that upon each energization of the solenoid, the disc 46 will be rotated through 90° and, as has been described above, such a rotation of the disc will cause a reversal of the connections between the differential head meter and the compartments in the rotatable drum.

Figure 3:
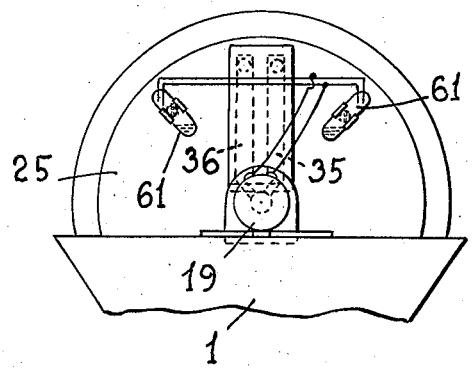
Fig. 3 is a rear elevation of the upper portion of the meter shown in Fig. 1.

On the rear side of the drum on either side of the housing for the conduits 35 and 36 are mounted a pair of mercury switches 61. Each of these switches preferably comprises a closed capsule partially filled with mercury and having a pair of contacts mounted in one end thereof. As is shown in Fig. 3, these switches are mounted on brackets in order that their angular position may be adjusted. It is apparent from the construction of the switches as shown that when the drum has been rotated through a predetermined angular distance, the mercury will flow to the end of the capsule containing the contacts, closing the circuit between the contacts and the switch.

These switches are each connected to a suitable source of electric current and are in circuit with the solenoid 50, in order that, when either one of these switches are closed, the solenoid 50 will be energized reversing the direction of flow of fluid through the valve 46.

As has been mentioned above, the conduits 44 and 45 are connected adjacent the restricted orifice in a differential head meter in the conduit through which the flow is to be measured. When flow passes through this principal differential head meter, a pressure differential will be set up in the conduits 44 and 45. This pressure differential will, due to the construction of the reversing switch described above, be transmitted to the compartments 28 and 29 within the drum, and as has been explained above, will cause a rotation of the drum due to the difference in pressure existing on the surface of the liquid within the drum. Continued existence of this pressure differential within the two chambers of the drum will cause the liquid within the drum to flow through the orifice 33 from one chamber into the other, causing a rotation of the drum which will continue as long as any pressure differential exists in the two compartments, the speed of this rotation being substantially proportional to a definite function of the existing pressure differential. Further, it will be clear that after the drum has been rotated through a predetermined angular movement, the mercury in one of the switches 61 will close the circuit through the solenoid 50 which will actuate the valve 46 to reverse the pressure differential existing in the compartments 28 and 29.

The reversal of this pressure differential will immediately cause a rotation of the drum in the opposite direction until the other mercury switch 61 is closed and the operation repeated. It will be clearly apparent from the foregoing that the speed of the rotation of the drum is dependent upon the magnitude of the pressure differential existing in the two compartments and also upon the size of the orifice 33.

In order to provide visual indication of the flow through the principal differential device a stationary indicating hand 88 is mounted upon one of the bearings 5 extending upwardly adjacent the drum. An arcuate scale 89 is secured to the drum in such a position that it will pass back and forth past the hand. The scale is provided with any suitable graduations.

An odometer 70 is mounted upon the lower shelf 58 in a position adjacent the bar 55. This odometer is actuated by a bifurcated trip lever 71 in engagement with a pin 72 extending through the lower portion of the bar 55, in order that the odometer may register one unit upon each energization of the solenoid 50. It is clear from the foregoing that the solenoid will be energized each time the drum has been rotated through a predetermined angular distance, and it will be further clear that energization of the solenoid causes a reversal of a pressure differential within the drum and a reversal of the direction of rotation of the drum and consequently the odometer 70 will register the number of times such reversal of the drum takes place.

Figure 8:
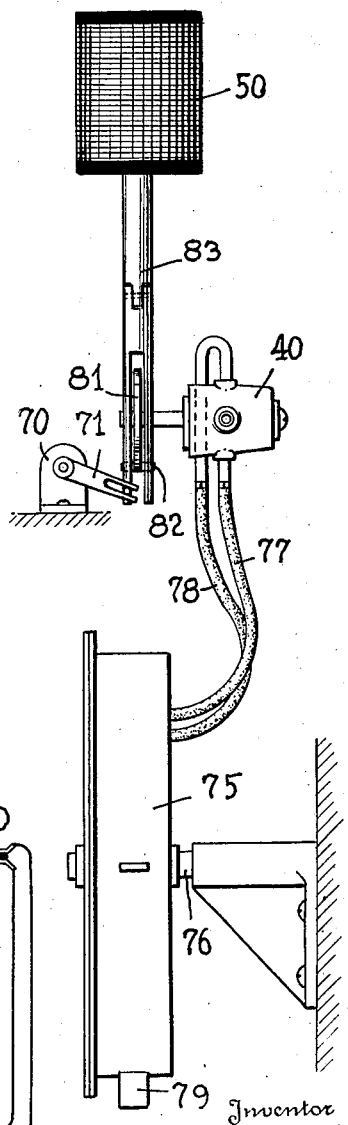
Fig. 8 is a side elevation of the diagrammatic view shown in Fig. 7, the electrical connections having been omitted.

In the diagrammatic views shown in Figs. 7 and 8, the structures shown and described in connection with the preceding figures have been somewhat modified.

A cylindrical drum 75 similar in construction to the drum 25 shown in the preceding figures, is mounted for free rotation upon a stationary shaft 76. The two compartments of this drum are connected by means of flexible conduits 77 and 78 to the reversing valve 40. A pair of ears 79 protrude from the periphery of the drum and are spaced a suitable angular distance apart less than 180 degrees. On diametrically opposed sides of the drum are mounted a pair of stationary mechanical switches 80, which comprise a pair of contacts extending into the path of movement of the ears 79. The switches 80 serve to control the circuit through the solenoid 50. It is apparent from this construction that as was the case in the preceding construction, that after a predetermined number of degrees of angular movement of the drum, one of the switches 80 will be closed, serving to actuate the reversing valve 40 to reverse the pressure differential existing within the two compartments of the drum. A modified form of means for actuating the reversing switch is shown in Figs. 7 and 8. In this switch, a plate 81 is rigidly connected to the rotatable operating member of the switch and has a toothed periphery comprising four teeth spaced at 90° intervals. These teeth are engaged by a pin 82, carried in the bifurcated end of the solenoid armature 83. The mounting and function of the odometer 70 shown in these figures is substantially the same as that described in connection with the odometer shown in Figs. 1 to 6.

The differential head device 85 to which the conduits 44 and 45 are connected is shown to be of the conventional Venturi type. However, it should be borne in mind that the apparatus herein disclosed is susceptible of use with practically any form of differential head meter in which a pressure differential is set up by means of flow through a conduit.

The function and operation of both modifications of the devices is substantially the same. The flow through the principal differential head device 85 creates a fluid pressure differential in the conduits 44 and 45 and due to the connection of these conduits to the rotary reversing valve 40, this difference in pressure is transmitted directly to the two chambers within the rotatable drum. The action of this difference in pressure in the two chambers on the surface of the liquid contained in the drum causes a rotation of the drum about its axis, due to the flow of fluid through the orifice 33 in the partition 30.

It will be apparent from the foregoing that the fluid pressure differential present in the principal differential head device will vary in accordance with the rate of flow of fluid through the principal differential head device. Variations of this pressure differential will thus cause corresponding variations in flow through the orifices 33 in the partition 30 in accordance with the pressure differential present in the compartments of the drum, the rate of flow being substantially proportional to the square root of said pressure difference. Hence the rate of rotation of the drum will be directly proportional to the rate of flow of fluid passing through the principal differential head device.

After the drum has been rotated through a predetermined angular movement, the circuit will be closed and the reversing switch actuated to reverse the pressure differential and rotate the drum in the opposite direction. By accurate control of the size of the orifice 33 and the adjustment of the mercury switches 61, it may be seen that a complete cycle of operation of the apparatus may be adjusted to represent a predetermined volume of fluid passing the principal differential head device, and consequently, a reading of the odometer plus the interim reading on the scale 89 which indicates the number of cycles of operation of the drum may easily be converted to a definite volumetric reading of the amount of fluid passing through the principal differential head device. It will be understood that the movement of the housing is, as a matter of fact, at a rate proportional to the square root of the pressure differential. However, the term "proportional" as used in the following claims is intended to be construed to include any determinable relation existing between these two factors.

It will be apparent that the foregoing are merely illustrative of some of the forms in which the apparatus of the present invention may be constructed and that many other and various modifications thereof may be made without departing from the spirit of the invention defined in the following claims.

I claim:

1. A flow meter comprising means including a main conduit for the fluid whose flow is to be measured and further including branch conduits wherein is produced a pressure difference which varies in proportion to the square of the rate of flow of fluid in said main conduit, an oscillatable housing, means for connecting said branch conduits to said housing, pressure responsive means within said housing for causing movement of said housing at a rate proportional to the square root of the pressure differential created in said conduits by the flow of fluid through said main while preventing flow of said fluid through the housing and means for registering the oscillations of said housing.

2. In a flow meter, an oscillatable housing, conduits in communication with said housing, pressure responsive means within said housing whereby a pressure differential in said conduits will cause a movement of said housing and auxiliary power means responsive to a predetermined movement of said housing for reversing said pressure differential in said conduits after said housing has been moved through a predetermined angular distance.

3. In a flow meter for determining the volume of fluid passing through a fluid main, a rotatable housing having a pair of chambers therein, a pair of conduits providing communication between each of said chambers and points in said main whereby pressure differentials between said points created by flow of fluid through said main will be transmitted to said chambers, pressure responsive means within said housing for causing a movement of said housing in accordance with the said pressure differential existing therein, a valve for controlling the reversal of said pressure differential and auxiliary power means for controlling said valve whereby said pressure differential may be reversed to cause a reverse rotation of said housing after a predetermined angular displacement of said housing, said auxiliary power means being controlled by said predetermined angular displacement of said housing.

4. A flow meter comprising means to produce a pressure difference resulting from the flow of fluid to be metered, two compartments, a fluid in said compartments which is substantially non-miscible with the fluid to be metered, means to apply the high pressure of the pressure difference created in the flow of fluid to one compartment and the low pressure of the pressure difference to the other compartment, means to alternate the compartments to which the high and low pressure differences are applied, connecting means between said compartments through which said non-miscible fluid passes from one compartment to the other at a rate proportional to the flow of fluid to be metered, said alternating means being set in operation by the passage of a predetermined quantity of the non-miscible fluid through said connecting means, the continued flow of fluid to be metered causing continued periodical operation of said alternating means and means to indicate the flow of fluid to be metered.

5. A flow meter comprising means to produce a pressure difference resulting from the flow of fluid to be metered, a vertically oscillable vessel, pivots therefor, said vessel having two compartments, one on each side of said pivots, a fluid in said compartments which is substantially non-miscible with and having a different weight than the fluid to be metered, means to apply the high pressure of the pressure difference created in the flow of fluid to one compartment and the low pressure of the pressure difference to the other compartment, means to alternate the compartments to which the high and low pressure differences are applied, connecting means between said compartments through which said non-miscible fluid passes from one compartment to the other at a rate proportional to the flow of fluid to be metered, the flow of fluid to be metered changing the amount of the non-miscible fluid in said compartments and the changing weight of the fluid in the compartments rocking said vessel on its pivots, said alternating means being set in operation by the rocking of said vessel a predetermined amount, the continued flow of the fluid to be metered causing continued periodical operation of said alternating means and continued oscillation of said vessel.

6. A flow meter comprising a vertically oscillable vessel, pivots therefor, said vessel having two compartments, one on each side of said pivots, a body of sealing fluid in said compartments, means for applying two different fluid pressures alternately to said compartments, means actuated by the oscillations of said vessel to alternate the supply of the two different fluid pressures to said compartments, a connection between said compartments through which the fluid in the compartments passes from one to the other at a rate proportional to the square root of the difference in the two different fluid pressures, the passing of successive predetermined amounts of fluid from one compartment to the other oscillating said vessel on its pivots.

WILLIAM C. WALKER.